United States Patent
Ludwigson et al.

[11] Patent Number: 6,060,679
[45] Date of Patent: May 9, 2000

[54] METHOD AND APPARATUS FOR DISPOSAL OF EDGE TRIM SCRAP CUT FROM A METAL PIECE

[75] Inventors: Robert G. Ludwigson, Brookfield, Wis.; John Alan Rowland, Bay Village, Ohio

[73] Assignee: MG Systems & Welding, Inc., Menomonee Falls, Wis.

[21] Appl. No.: 09/229,524

[22] Filed: Jan. 13, 1999

[51] Int. Cl.[7] ................................... B23K 10/00
[52] U.S. Cl. ................ 219/121.44; 219/121.39; 219/121.48; 83/404.1; 83/408; 266/77
[58] Field of Search .............. 219/121.39, 121.44, 219/221, 121.67, 121.48; 83/28, 177, 53, 404.1, 404.3, 408; 266/77, 73

[56] References Cited

U.S. PATENT DOCUMENTS

| | | | |
|---|---|---|---|
| 2,492,526 | 12/1949 | Geibig | 158/27.4 |
| 4,179,101 | 12/1979 | Brautigam | 266/77 |
| 4,266,989 | 5/1981 | Ludwigson | 148/7 |
| 5,102,473 | 4/1992 | Grohmann | 148/9 |
| 5,286,006 | 2/1994 | Ogura | 266/77 |

*Primary Examiner*—Mark Paschall
*Attorney, Agent, or Firm*—Andrus, Sceales, Starke & Sawall

[57] ABSTRACT

An edge trimmed piece that is cut from a long metal slab with a cutting torch carried along the slab edge is automatically crosscut into short manageable length pieces with a secondary crosscutting torch. Both torches are mounted on the same carriage and the crosscutting torch is periodically activated to move along an acute angular path with respect to the edge trim cut, resulting in an effective crosscut transverse to the main trim cut. The crosscutting operation may be carried out without interruption of the edge trim torch, thereby enhancing productivity and trim cut quality.

10 Claims, 2 Drawing Sheets

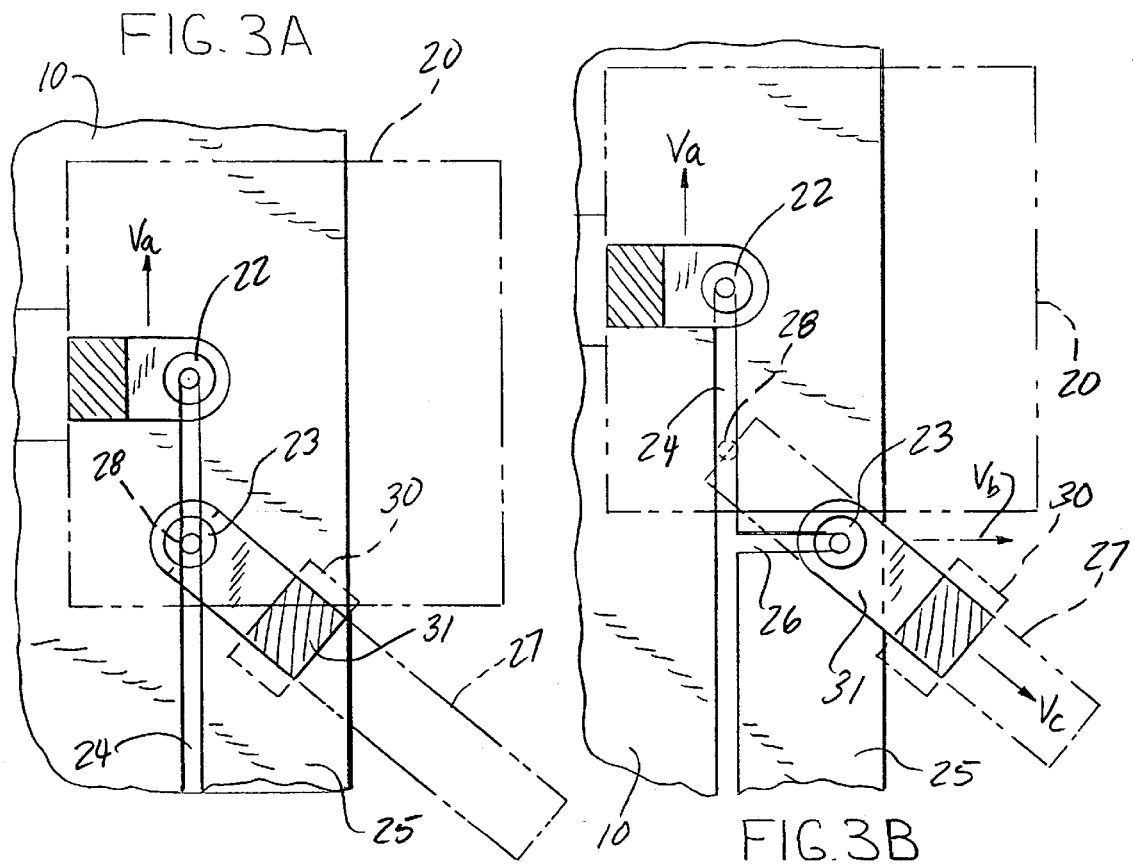
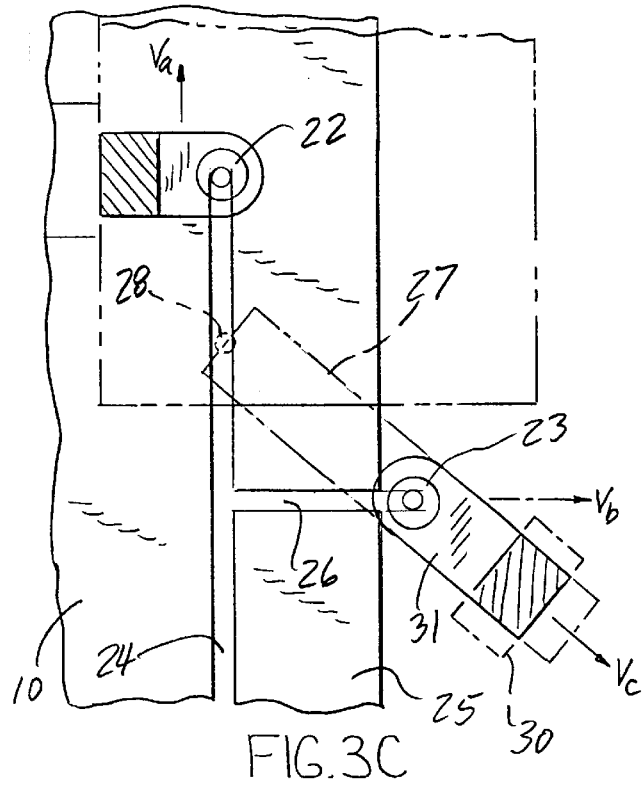
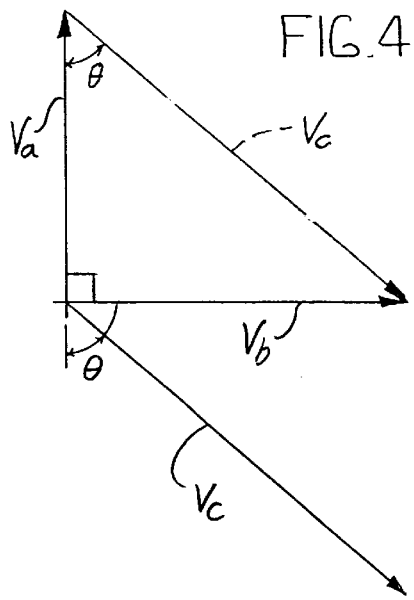

METHOD AND APPARATUS FOR DISPOSAL OF EDGE TRIM SCRAP CUT FROM A METAL PIECE

BACKGROUND OF THE INVENTION

The present invention pertains to cutting metal workpieces with a cutting torch and, more particularly, to an apparatus and method for handling torch cut edge trim pieces by cutting them to manageable lengths without interfering with the continuous operation of the main edge cutting torch.

In the production of continuously cast steel slabs, it is customary to trim one or both lateral edges of the slab to obtain a desired slab width. Edge trimming is typically accomplished by moving a carriage-mounted cutting torch longitudinally over the slab along a linear path defining the edge cut. Slabs may typically range in thickness from three to twelve inches (about 75 to 300 mm) and, as a result, the edge-cut trim piece or pieces eventually become so long that they are unwieldy and difficult to handle. Therefore, as a trim piece is continuously cut from a slab, it is customary to periodically cut the trim piece into manageable lengths so they can be easily handled and disposed of. If the movement of the main edge cutting torch is interrupted to make a trim cut, production time may be lost and the quality of the cut edge of the slab may be adversely affected.

A similar problem occurs in conventional shape cutting machines in which a plate is traversed by an overhead cutting torch which, in certain cases, leaves a long scrap edge piece. Typically, the machine operator will periodically cut the scrap edge piece into short manageable lengths with a hand-held cutting torch.

The prior art describes processes and apparatus for making a transverse cut across a metal billet or slab. For example, U.S. Pat. No. 5,102,473 shows adjustable angular sliding movement of a cutting torch over a moving billet to make a transverse right angle cut. U.S. Pat. Nos. 2,202,130 and 4,179,101 show multi-torch head machines for cutting and edge shaping. U.S. Pat. No. 4,281,822 discloses the use of separate longitudinal and cross cut torches, each of which is carriage-mounted and operated in a conventional manner to provide respective longitudinal and transverse cuts in a moving slab from a continuous casting machine.

SUMMARY OF THE INVENTION

In accordance with the present invention, edge-cut scrap pieces are cut to manageable lengths automatically and without interrupting the main edge trimming process with an independent cross cutting torch that moves with the main edge cutting torch and is additionally driven to move at a selected angle and/or speed periodically across the edge-cut scrap piece to provide a manageable length piece.

The apparatus of the present invention includes a carriage which is mounted horizontally over and is movable relative to the slab or other workpiece in the direction of the desired edge-cut and at a selected edge cutting speed. An edge cutting torch is mounted on the carriage for movement therewith along the path of the edge trim cut. A crosscutting torch is also mounted on the carriage for movement therewith and for independent horizontal movement across the edge-cut piece at an acute angle to the path of the edge cut and at a selected crosscutting speed. Means are also provided for adjusting one or both of the angle of movement and the speed of the cross cutting torch to provide a cross cut which is generally transverse to the cut edge.

Preferably, the cross cutting torch is mounted on a cross cut track which is pivotally attached to the carriage for horizontal angular adjustment on a vertical axis. The cross cutting torch is mounted to trail the edge cutting torch in the direction of the edge cut path and a crosscut torch drive moves the crosscut torch along the track from the cut edge to the outer edge of the edge-cut piece.

Drive means provides relative movement between the carriage and the workpiece and movement of the crosscut torch on the carriage. Preferably, the carriage drive is operative to move the carriage along the workpiece.

In accordance with the corresponding method of the present invention, a metal workpiece is simultaneously edge-cut to form a trim piece and the edge-cut trim piece is cut into manageable lengths utilizing the steps of (1) mounting a carriage to operate horizontally relative to the metal workpiece in the direction of the desired edge-cut and at a selected edge cutting speed, (2) mounting an edge cutting torch on the carriage for movement therewith along a path of the cut edge, (3) mounting a crosscutting torch on the carriage for movement therewith and for independent horizontal movement across the edge-cut piece at an acute angle to the path of the edge cut and at a selected crosscutting speed, and (4) adjusting at least one of the angle of movement and the crosscutting speed to provide a crosscut generally transverse to the edge-cut.

BRIEF DESCRIPTION OF THE DRAWINGS

FIG. 3A is a further enlarged detail of FIG. 2 showing the crosscutting torch prior to commencement of the crosscut.

FIG. 3B is a further enlarged detail circumscribed by line 3B—3B of FIG. 2 showing the crosscutting torch as positioned therein.

FIG. 3C is a further enlarged detail similar to FIGS. 3A and 3B showing the crosscutting torch at the completion of its cut.

FIG. 4 is a vector diagram showing the relative speeds of the edge cutting and crosscutting torches required to provide the desired transverse crosscut.

DETAILED DESCRIPTION OF THE PREFERRED EMBODIMENT

Figure 1:
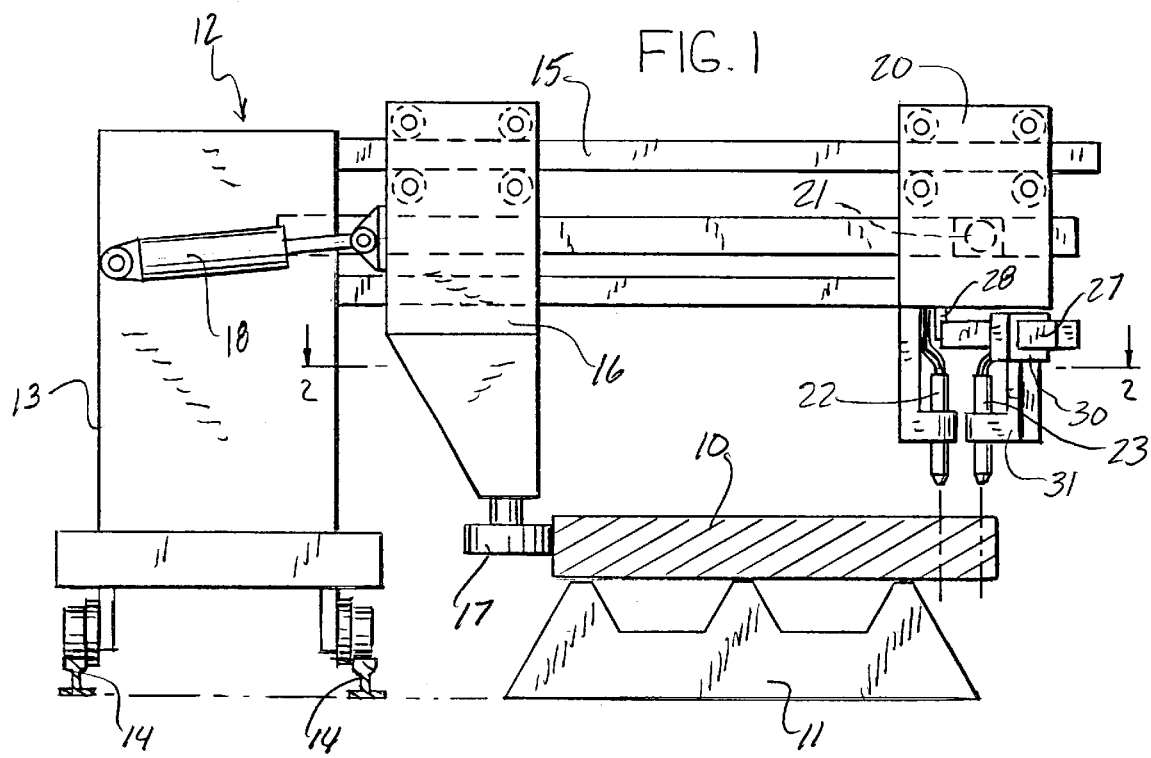
FIG. 1 is an end elevation view of a carriage for the two cutting torches of the present invention which are shown positioned to make the edge-cut and crosscut on a metal slab.

Referring to FIG. 1, a metal slab 10, such as formed for example from continuous cast steel, is shown in transverse cross section carried on a conventional support 11. A slab cutting machine 12 is of a conventional cantilever construction, but other torch-carrying cutting machines may also be utilized with the apparatus of the present invention and in a manner utilizing the method of this invention. The cutting machine 12 includes a wheeled truck 13 adapted to move along a pair of tracks 14 which extend longitudinally along one side of the slab 10. Extending in cantilever fashion from one side of the truck 13 is a carriage arm 15 which is positioned to extend over the slab 10. A guide wheel carriage 16 is mounted on the inner end of the carriage arm 15 and includes one or more guide wheels 17 adapted to engage and ride along one edge of the slab 10 as the truck 13 moves along the tracks 14. The position of the guide wheel carriage 16 can be selectively varied with a lateral positioning device such as a fluid cylinder 18.

A torch carriage 20 is mounted on the outer end of the carriage arm 15 for positioning movement along the arm.

The torch carriage 20 may be moved and positioned along the carriage arm by a separate positioning motor 21 or a similar device. Depending downwardly from the torch carriage 20 are a main edge cutting torch 22 and a secondary crosscutting torch 23. A second torch carriage (not shown) may be added in place of the guide wheel carriage 16. In this case, extensible guide wheels or guide rollers are carried by the truck 13 and take the place of the guide wheels 17.

Figure 2:
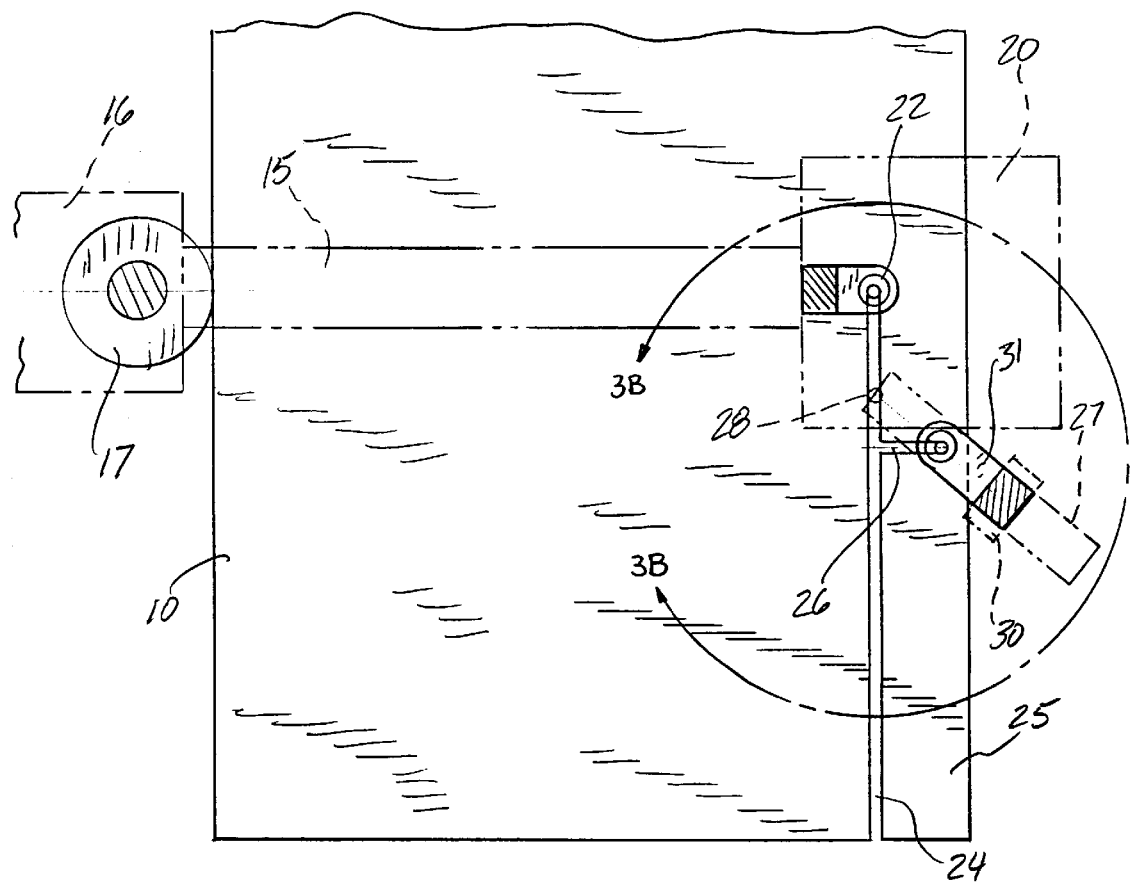
FIG. 2 is an enlarged sectional detail taken on line 2—2 of FIG. 1.

Referring also to FIG. 2, to provide a conventional edge trim cut 24, the torch carriage 20 is moved laterally along the carriage arm 15 to a selected edge position above the slab 10. The carriage truck 13 is then driven along the side of the slab and the edge cutting torch 22 is operated to provide the indicated trim cut. The cutting torches 22 and 23 may be conventional oxy-fuel torches, but may alternately comprise plasma torches or any other type of non-contact cutting tool. The apparatus described to this point and its operation are conventional.

As the cutting machine 12 moves along the length of a long slab, the trim cut 24 forms an edge-cut scrap piece 25 which must be periodically cut to manageable lengths for handling and disposal. A transverse cross cut 26 to create the short manageable scrap piece is provided by the crosscutting torch 23. Referring also to FIGS. 3A—3C, the crosscutting torch 23 is mounted to travel horizontally along a crosscut track 27. The crosscut track, in turn, is connected to the torch carriage 20 on a vertical pivot 28, so that the horizontal angular orientation of the crosscut track 27 may be selectively varied. The crosscutting torch 23 depends downwardly from a torch mounting bracket 31 which, in turn, is carried by a slide mechanism 30 operable along the crosscut track 27. The slide mechanism 30 may be operated by any conventional actuator, such as a rack and pinion, fluid operated actuator, and the like. Preferably, the slide mechanism operator may be adjusted to operate at selected speeds and, in combination with the angular adjustability of the crosscut track 27 on its pivot 28, the cross cutting torch 23 may be set to provide a true transverse crosscut 26 simultaneously with continuous operation of the edge cutting torch 28 creating the main trim cut 24, all in a manner which will be described hereinafter.

In FIG. 4, the vector $V_a$ represents the velocity of edge cutting torch 22 which, of course, is the velocity of the cutting machine truck 13 moving along the lateral edge of the slab 10. The vector $V_b$ represents the desired effective crosscutting velocity of the crosscutting torch 23 to provide a crosscut 26 that is transverse to the main trim cut 24. The vector $V_c$ represents the actual velocity of the crosscutting torch 23 as it moves along the crosscut track 27 at an acute angle $\theta$ with respect to the linear path of the trim cut 24. The pivotal mounting 28 of the crosscut torch track 27 is positioned in alignment with the edge cutting torch 22 on the linear path of the trim cut 24 and to trail the edge cutting torch along its path of trim cutting movement. With the proper selection of crosscut track angle and crosscutting torch speed, the angular movement of the crosscutting torch along its track 27, while it is simultaneously carried on the torch carriage 20 in the direction of the trim cut 24, will produce the transverse crosscut 26 at the desired crosscutting velocity $V_b$. For example to provide a trim cut 24 of desired high quality in a slab of given thickness, it may be desirable to operate the edge cutting torch 22 at a cutting velocity $V_a$ of ten inches per minute (about 250 mm per minute). Because the quality of the crosscut 26 forming a manageable length scrap piece does not have to be particularly good, it may be desirable to provide an effective crosscut velocity $V_b$ somewhat slower than the edge cutting torch velocity $V_a$ in order to assure that the crosscut starts properly, continues across the full width of the edge-cut piece, and is not lost during the crosscutting operation. A crosscut velocity $V_b$ of, for example, eight inches per minute (about 200 mm per minute) might be chosen. Using conventional trigonometric calculation, the angle $\theta$, defining the acute angle between the trim cut 24 and the cross cut track 27 is 38.66°, and the actual velocity $V_c$ of the crosscutting torch 23 along the track 27 is 12.8 inches per minute (about 320 mm per minute). The angle $\theta$ may be adjusted in either direction with a corresponding adjustment in the crosscutting torch speed $V_c$ while still maintaining a generally transverse direction to the crosscut 26.

It is important to prevent the crosscutting torch 23 from moving laterally inwardly over the slab beyond the trim cut 24 in order to avoid undesired damage to the trim cut edge of the slab. Appropriate stops on the crosscut track 27 may be provided to prevent movement of the crosscut torch 23 inwardly beyond the approximate position of the vertical pivot 28. The wide variability in angular adjustment of the crosscut track 27 and in the selected actual crosscutting torch velocity $V_c$ permits the system to be adapted to address other considerations. For example, if the crosscut trim pieces have value beyond mere scrap value, the crosscut velocity $V_b$ may be selected to be close to or the same as the edge cutting torch velocity $V_a$ to provide a better and more precise crosscut 26.

The apparatus and method of its operation of the present invention may also be applied to a conventional shape cutting machine in which programmed operation of a main cutting torch over a workpiece comprising a horizontal plate produces desired torch-cut shapes. Such shape cutting operations typically also result in edge trim pieces which must be periodically cut to manageable lengths and removed from the cutting table. An auxiliary crosscutting torch of the type described above may be mounted on the main torch cutting head and operated in the manner described above to periodically cut the edge trim piece laterally into manageable lengths.

I claim:

1. An apparatus for simultaneously edge-cutting a metal workpiece and crosscutting the edge-cut piece into manageable lengths comprising:

a carriage mounted horizontally over the workpiece and movable relative to the workpiece in the direction of the desired edge cut and at a selected edge cutting speed;

an edge cutting torch mounted on the carriage for movement therewith along a path of the edge cut;

a crosscutting torch mounted on the carriage for movement therewith and for independent horizontal cutting movement across the edge-cut piece, at an acute angle to the path of the edge cut and at a selected crosscutting speed; and means for adjusting at least one of the angle of movement and the crosscutting speed to provide a crosscut generally transverse to the edge cut.

2. The apparatus set forth in claim 1 including a crosscut track carrying the crosscutting torch and pivotally attached to the carriage for horizontal angular adjustment on a vertical pivot axis.

3. The apparatus as set forth in claim 2 wherein the crosscutting torch is mounted to trail the edge cutting torch in the direction of the edge cut path, and further comprising a crosscut torch drive adapted to move the crosscut torch along the track from the cut edge to the outer edge of the edge-cut piece.

4. The apparatus as set forth in claim 1 including drive means for providing relative movement between the carriage and the workpiece and for moving the crosscut torch on the carriage.

5. The apparatus as set forth in claim 4 wherein the workpiece is stationary and the drive means includes a carriage drive operative to move the carriage along the workpiece.

6. A method for simultaneously edge-cutting a metal workpiece and crosscutting the edge-cut piece into manageable lengths, said method comprising the steps of:

(1) positioning a carriage for horizontal movement over and relative to the workpiece in the direction of the desired edge cut and at a selected edge-cutting speed;

(2) mounting an edge-cutting torch on the carriage for movement therewith along a path of the edge cut;

(3) mounting a crosscutting torch on the carriage for movement therewith and for independent horizontal cutting movement across the edge-cut piece at an acute angle to the path of the edge cut and at a selected crosscutting speed; and (4) adjusting one of the angle of movement and the crosscutting speed to provide a crosscut which is generally transverse to the edge-cut.

7. The method as set forth in claim 6, including the steps of:

(1) mounting the cross cutting torch on a crosscut track; and (2) pivotally attaching the crosscut track to the carriage for horizontal angular adjustment on a vertical pivot axis.

8. The method as set forth in claim 7 including the steps of:

(1) mounting the crosscutting torch to cause the crosscutting torch to trail the edge cutting torch in the direction of the edge-cut path; and (2) driving the crosscut torch along the crosscut track from the cut edge to the outer edge of the edge-cut piece.

9. The method as set forth in claim 6 including the steps of:

(1) providing relative movement between the carriage and the workpiece; and (2) independently moving the crosscut torch on the carriage.

10. The method as set forth in claim 9 wherein the step of providing relative movement comprises driving the carriage along a stationary workpiece.

* * * * *